United States Patent
Heimann et al.

(10) Patent No.: US 10,166,595 B2
(45) Date of Patent: Jan. 1, 2019

(54) ROLLING TOOL

(71) Applicant: HEGENSCHEIDT-MFD GmbH & CO. KG, Erkelenz (DE)

(72) Inventors: Alfred Heimann, Aachen (DE); Jandrey Maldaner, Roetgen (DE)

(73) Assignee: HEGENSCHEIDT-MFD GmbH & CO. KG, Erkelenz (DE)

( * ) Notice: Subject to any disclaimer, the term of this patent is extended or adjusted under 35 U.S.C. 154(b) by 359 days.

(21) Appl. No.: 14/907,963

(22) PCT Filed: Jul. 24, 2014

(86) PCT No.: PCT/DE2014/000392
§ 371 (c)(1),
(2) Date: Jan. 27, 2016

(87) PCT Pub. No.: WO2015/014337
PCT Pub. Date: Feb. 5, 2015

(65) Prior Publication Data
US 2016/0167107 A1    Jun. 16, 2016

(30) Foreign Application Priority Data
Jul. 27, 2013  (DE) .................... 20 2013 006 779 U

(51) Int. Cl.
*B23P 9/02* (2006.01)
*B21H 7/18* (2006.01)
(Continued)

(52) U.S. Cl.
CPC ................ *B21H 7/185* (2013.01); *B23P 9/02* (2013.01); *B24B 5/42* (2013.01); *B24B 39/04* (2013.01); *B23P 2700/07* (2013.01)

(58) Field of Classification Search
CPC .......... B21H 7/18; B21H 7/182; B21H 7/185; B23P 9/02; B23P 2700/07; B24B 39/04
See application file for complete search history.

(56) References Cited

U.S. PATENT DOCUMENTS 2,841,861 A * 7/1958 Williams ............... B21H 7/185
                                                          29/6.01
2,876,528 A * 3/1959 Wulpi ..................... B21H 7/185
                                                          29/6.01
(Continued)

FOREIGN PATENT DOCUMENTS

DE        2609787 A1    9/1977
DE    102006024715 B4   11/2007
(Continued)

OTHER PUBLICATIONS

International Search Report (English and German) for PCT/DE2014/000392, ISA/EP, Rijswijk, NL, dated Jan. 21, 2015.
(Continued)

*Primary Examiner* — Edward Tolan
(74) *Attorney, Agent, or Firm* — Harness, Dickey & Pierce, P.L.C.

(57) ABSTRACT

A rolling tool for the roller finishing of bearing surfaces of a crankshaft is pivotable around a crankshaft axis, with a finishing roller head and with a support roller head. In order to prevent damage to the guide mechanisms, the roller finishing roller is guided on all sides in a roller cage and the finishing roller head has a frame wherein it is mounted pivotably around a first pivot axis which is perpendicular to the crankshaft axis and parallel to a tangent on a working side of the roller finishing roller. Additionally or alternatively, the support roller head comprises a support roller frame in which the support roller housing is mounted pivotably around a second pivot axis perpendicular to the crankshaft axis and parallel to the first pivot axis, and around a third pivot axis perpendicular to the crankshaft axis and perpendicular to the first pivot axis.

19 Claims, 3 Drawing Sheets

(51) Int. Cl.
    *B24B 39/04*      (2006.01)
    *B24B 5/42*       (2006.01)

(56) References Cited

U.S. PATENT DOCUMENTS

| | | | | |
|---|---|---|---|---|
| 4,575,289 | A * | 3/1986 | Fischer | B23F 19/06 |
| | | | | 409/33 |
| 6,393,886 | B1 * | 5/2002 | Bagusche | B24B 5/42 |
| | | | | 72/107 |
| 6,666,061 | B2 | 12/2003 | Heimann | |
| 7,021,100 | B2 * | 4/2006 | Heimann | B21H 7/185 |
| | | | | 72/110 |
| 7,487,657 | B2 | 2/2009 | Steffens | |
| 8,020,293 | B2 | 9/2011 | Naumann | |
| 9,015,939 | B2 | 4/2015 | Reeb et al. | |
| 2002/0023470 | A1 * | 2/2002 | Bagusche | B24B 39/003 |
| | | | | 72/110 |
| 2002/0189312 | A1 | 12/2002 | Heimann | |
| 2003/0164018 | A1 * | 9/2003 | Bagusche | B21H 7/185 |
| | | | | 72/110 |
| 2005/0107230 | A1 * | 5/2005 | Ostertag | B21H 7/185 |
| | | | | 492/1 |
| 2005/0188735 | A1 * | 9/2005 | Bagusche | B21H 7/185 |
| | | | | 72/110 |
| 2007/0084262 | A1 * | 4/2007 | Steffens | B21H 7/185 |
| | | | | 72/110 |
| 2008/0173055 | A1 | 7/2008 | Steffens | |
| 2009/0116921 | A1 | 5/2009 | Naumann | |
| 2010/0146753 | A1 | 6/2010 | Reeb et al. | |

FOREIGN PATENT DOCUMENTS

| | | |
|---|---|---|
| DE | 202007016473 U1 | 3/2008 |
| DE | 102007003772 A1 | 8/2008 |
| DE | 102007028888 A1 | 1/2009 |
| EP | 1262280 A1 | 12/2002 |

OTHER PUBLICATIONS

Written Opinion of the ISA (German) for PCT/DE2014/000392, ISA/EP, Rijswijk, NL, dated Jan. 21, 2015.

* cited by examiner

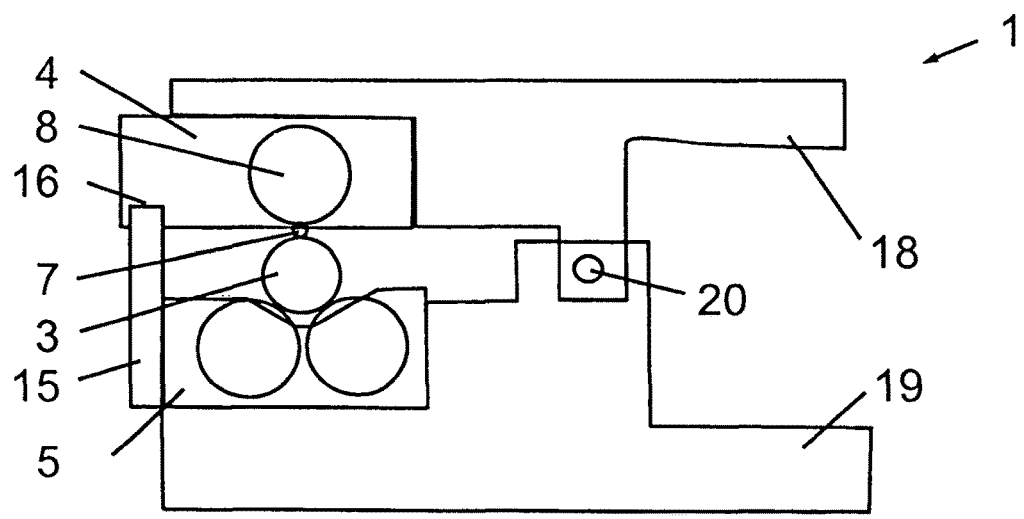
Fig. 2
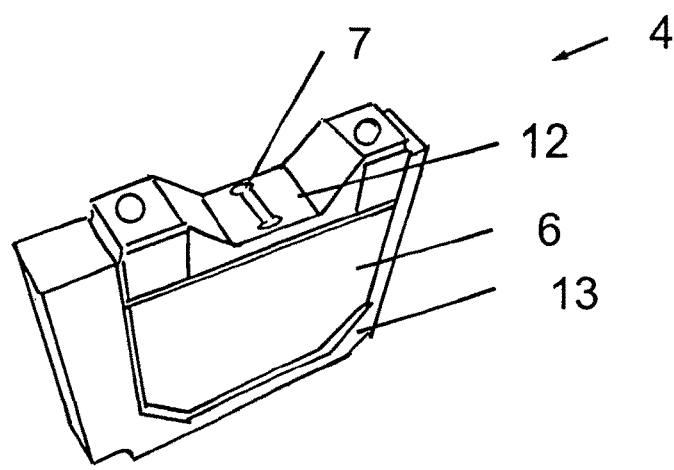
Fig. 3
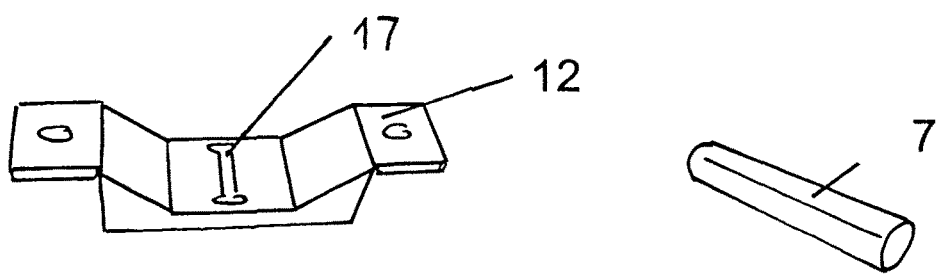
Fig. 4
Fig. 5

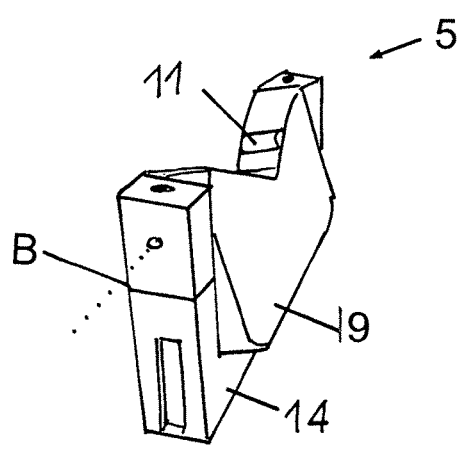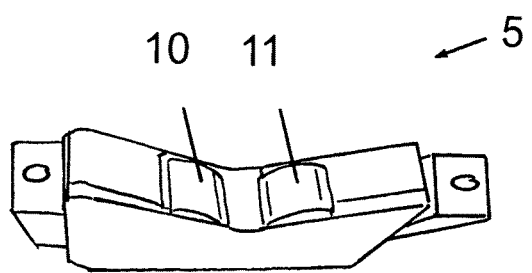
Fig. 6
Fig. 7

ROLLING TOOL

CROSS REFERENCE TO RELATED APPLICATIONS

This application is a 371 U.S. National Stage of International Application No. PCT/DE2014/000392, filed Jul. 24, 2014. This application claims the benefit of German Patent Application No. 202013006779.9, filed Jul. 27, 2013. The disclosures of the above applications are incorporated herein by reference.

FIELD

The invention relates to a rolling tool for the roller finishing of bearing surfaces of a crankshaft which is pivotable around a crankshaft axis with a finishing roller head and a support roller head, wherein the finishing roller head has a roller finishing roller and a pressure roller which is mounted in a finishing roller head housing and which supports the roller finishing roller, and wherein the support roller head has two supporting rollers which are mounted in a supporting roller housing and with which the crankshaft can be supported against a rolling force acting on the crankshaft through the roller finishing roller.

BACKGROUND AND SUMMARY

The development of combustion engines, for example car engines, has led to smaller engines, smaller bearings and higher loads on the crankshafts. Bearings which are subjected to high loads work partially in a mixed friction state in which a lubricating layer consisting of engine oil does not completely separate crankshaft bearing surfaces and mating surfaces from one another. The start-stop system introduced to reduce fuel consumption represents a further strain on bearings. Due to the high levels of dimensional accuracy and low surface roughness of the bearing surfaces, existing increased requirements placed on the bearings can be fulfilled.

The main method used in the finishing of bearing seats of crankshafts in the prior art is belt finishing, in which a polishing belt which is moved in oil and whose surface is provided with cutting means removes material from bearing surfaces and thereby improves the surface quality of the bearing surfaces. The problem with this process is the disposal of the contaminated oil and the wear of the polishing belt.

From DE 10 2006 024 715 B4 a process is known for the machining of the bearing seats of the main and pin bearings of crankshafts, in which a rolling method is used for the finishing of bearing surfaces. For this process, the rolling tools used are a finishing roller head and a support roller head, wherein the finishing roller head has a roller finishing roller and a pressure roller which is mounted in a finishing roller head housing and which supports the roller finishing roller, and wherein the support roller head has two support rollers which are mounted in a support roller housing and with which the crankshaft is supported during roller finishing against a rolling force acting on the crankshaft through the roller finishing roller.

Compared to belt finishing under oil, this rolling process is an environmentally friendly process, as no contaminated oil is produced. Furthermore, the process is also inexpensive due to the long service life of the rolling tools. During the practical application of roller finishing, however, sporadic axial helical movements of roller finishing rollers have been observed, which can result in damage to the guide mechanisms of the roller finishing roller and/or the crankshaft.

The object of the invention is therefore to create a rolling tool during the use of which in the roller finishing of crankshaft bearings such damage to guide mechanisms of the roller finishing roller or crankshaft is largely excluded or at least occurs less often than during the use of conventional rolling tools.

This object is achieved by a rolling tool of the type defined above, in which the roller finishing roller is guided on all sides in a roller cage and in which the finishing roller head has a finishing roller head frame in which the finishing roller head housing is mounted such that it is pivotable around a first pivot axis which is perpendicular to the crankshaft axis and parallel to a tangent on a working side of the roller finishing roller and/or in which the support roller head has a support roller frame in which the support roller housing is mounted such that it is pivotable around a second pivot axis which is perpendicular to the crankshaft axis and parallel to the first pivot axis and around a third pivot axis which is perpendicular to the crankshaft axis and perpendicular to the first pivot axis.

If the rolling tool is correctly aligned in relation to the bearing surface of the crankshaft which is to be processed by rolling, the crankshaft axis and the rotational axes of the rollers of the rolling tool, i.e. the roller finishing roller, the pressure roller and the two support rollers, are aligned parallel to one another and no inadmissibly large axial forces occur on the rollers. The bearing surfaces to be processed may be the bearing seats of the main bearing and of the pin bearings or connecting rod bearings. However, it is possible for other areas, for example journal bearing seats on the ends of the crankshaft or bearing surfaces of other shafts to be roller finished. The bearing surfaces of the crankshaft have a shape which is at least approximately cylindrical. However, as a deviation from straight cylinder outer surfaces, slightly convex (spherical) or slightly concave surfaces can also be provided. The main bearings are located flush on the crankshaft axis, while the axes of the connecting rod bearings are aligned parallel to the crankshaft axis and spaced radially by means of crank cheeks away from the crankshaft axis.

In a rolling tool designed according to the invention, the roller finishing roller is guided in a one-piece roller cage. In this roller cage, the two sliding surfaces have a precise fixed orientation with respect to one another for axial end faces of the roller finishing roller and the two sliding surfaces for areas of the lateral surface of the roller finishing roller which face each other. Therefore, alignment tolerances which might occur in the case of guide mechanisms consisting of multiple pieces will not occur here. The roller cage therefore helps to ensure the proper alignment of the roller finishing roller through the provision of correct and simple support in the finishing roller head.

Furthermore, the finishing roller head and/or the support roller head have/has a pivot axis. This means that the roller housing of at least one of the two heads is pivot mounted. However, even the roller housings of both heads can be pivotable in order to correct for any deviations in the orientation of the heads with respect to the crankshaft.

The finishing roller head which is equipped with a pivot axis has a finishing roller head frame in which the finishing roller head housing is pivot mounted around a first pivot axis which is perpendicular to the crankshaft axis and parallel to a tangent on a working side of the roller finishing roller. The working side of the roller finishing roller is to be understood as the line which touches the bearing surface when the rolling tool is used. In the case of a crankshaft axis which is horizontally aligned, for example, and a roller finishing roller arranged parallel to the crankshaft axis vertically above the crankshaft, the first pivot axis is a horizontal pivot axis around which the roller finishing roller can be pivoted and aligned parallel to the crankshaft axis. The alignment around the first pivot axis is either fixed in position before rolling or occurs automatically during the rolling process.

In an advantageous embodiment, the finishing roller head frame can be mounted in an arm of the rolling tool instead of a known finishing roller head housing according to the prior art.

Analogously to the finishing roller head described above, a support roller head can also be constructed to be pivotable, so that the rotation axes of the support rollers can be aligned parallel to the axis of the crankshaft section which is to be processed. Optimally aligned support rollers can provide optimum support to the crankshaft without the machined crankshafts being inadmissibly deformed. In the support roller head housing of the support roller head, two support rollers are mounted with parallel axes of rotation which are spaced apart from one another. In turn, the support roller head housing is mounted in the support roller frame such that it is pivotable around a second pivot axis and around a third pivot axis. The second pivot axis is aligned perpendicular to the crankshaft axis and parallel to a tangent on a working side of the roller finishing roller. Pivoting around the second pivot axis eliminates or minimises any inclination of the two support rollers with respect to the crankshaft axis. Pivoting around the third pivot axis turns the plane in which the parallel axes of rotation of the support rollers are located such that the parallel axes of rotation run parallel to the crankshaft axis. This means that pivoting around the third pivot axis eliminates or minimises tilting of the support rollers with respect to the crankshaft.

According to a further embodiment, the first pivot axis is formed as a tangent on the working side of the roller finishing roller with the tangent lying axially in the middle of the roller finishing roller. In this arrangement, the pivot axis is structurally arranged on the bearing surface with respect to which the roller finishing roller is to be aligned. This results in a direct mechanical coupling between the bearing surface and the finishing roller head. In this arrangement of the first pivot axis, self-adjustment of the finishing roller head is possible, whereby a torque resulting from an inclination of the roller finishing roller with respect to the bearing surface and the crankshaft axis is taken advantage of in order to align the finishing roller head and the roller finishing roller in an optimum manner parallel to the crankshaft axis.

Alternatively, the first pivot axis "A" is formed as a secant passing through the crankshaft and has a maximum distance from a tangent on the working side of the roller finishing roller which is smaller than 10 millimeters. In this embodiment the finishing roller head protrudes further above the bearing surface which is to be processed than in the first embodiment described. This protrusion is associated with a leverage effect and an increased torque which causes the pivotal movement. Due to the limited amount of space available in the rolling tool, the maximum protrusion is limited to approximately 10 millimeters.

According to a further embodiment, the second pivot axis "B" is formed as a secant which passes through the crankshaft and runs through support points or on the support rollers close to the support points of the crankshaft. The term "close to" here is understood to mean a deviation of a few, at most approximately 10 millimeters. The function of the support roller head requires that it partially encloses the crankshaft at the support location. A wide enclosure results in the secure pivoting of the support roller head due to a leverage effect. Consequently, a wide enclosure or overhang is desirable. A physical limit to the longitudinal size of the overhang is formed by the finishing roller head located opposite the support roller head.

In a further variant, the roller cage has a strip-shaped opening whose width on a side of the roller cage facing away from the finishing roller head is smaller than the diameter of the roller finishing roller. Here, the roller finishing roller is enclosed by the roller cage in the finishing roller head. This prevents the roller finishing roller from falling out unintentionally irrespective of the spatial position of the finishing roller head. For the roller finishing roller to be replaced, the roller cage has to be dismantled and remounted with the new roller finishing roller and adjusted. With a suitable installation position of the finishing roller head it is also possible to use a roller cage into the strip-shaped opening of which a roller finishing roller can be inserted without dismantling the roller cage. For example, only on its lower side does the roller cage have a projection which is provided next to the crankshaft in order to prevent the roller finishing roller from falling out of the roller finishing roller head.

In a favourable embodiment, the finishing roller head and the support roller head can be connected together by at least one coupling element. The components which are connected in this way form a mechanical unit with a fixed spatial reference to one another. As a result, relative position tolerances between the finishing roller head and support roller head are small. The coupling element can be a pin which is attached to the support roller head, for example, and which is designed to engage in a centring hole in the finishing roller head. The rolling tool is designed in one embodiment as a forcipate tool with two tool arms connected together by a hinge. The support roller head is attached to one tool arm and the finishing roller head to the other tool arm. The hinge and the tool arms act here as the first coupling elements and the pin as a further coupling element. Springs and grooves can also be provided as coupling elements, for example.

The roller finishing roller should preferably have a cylindrical shape with a diameter of between 1 mm and 20 mm and a length which is greater than the width of the bearing surface. Thin cylindrical rollers with a diameter which is only a few millimeters in size are also referred to as needles. The entire width of the bearing surface is processed in a single operation in a roller finishing process, whereby smooth bearing surfaces are produced with a single revolution of the crankshaft and corresponding one-time roller finishing. The lateral protrusion of the roller finishing roller over the bearing surface is designed to be as small as possible, as there are only small spacings present between the bearing surface and the crank cheeks and in these spaces it is necessary to incorporate freedoms of movement for the finishing roller head and axial guide mechanisms of the roller cage. Small diameters of the roller finishing roller are selected, for example, if an elastic deflection is provided for the roller finishing roller during roller finishing.

According to other embodiments, the pressure roller and the support rollers have cylindrical, concave or spherical peripheral surfaces corresponding to a cylindrical, spherical or concave shape of the bearing surface to be processed. The bearing surfaces have a cylindrical shape visually, which can also be designed to be structurally cylindrical. In this case, the support rollers and the pressure roller are also designed to be cylindrical to match the bearing surface. For reasons which, for example, may result from a bearing lubrication concept, the bearing surfaces can also have a spherical or convex shape. These deviations from a lateral cylinder surface are barely perceptible visually, as the curvatures usually are very small, for example 5 μm in the case of a 20 mm roller width. In this case, the support rollers and the pressure roller have peripheral surfaces which curve inversely to the bearing surface, i.e. peripheral surfaces which have a concave curvature where the bearing surfaces are spherical, or peripheral surfaces which have a convex curvature where the bearing surfaces are concave. The peripheral surface contour of the pressure roller is transferred by the rolling force to the roller finishing roller, which deflects elastically when adapting to the peripheral surface of the pressure roller.

A material which has good sliding properties should preferably be used for the roller cage because the roller finishing roller intermittently slides along contact surfaces with the roller cage. Good sliding properties ensure that in spite of this contact, the roller cage is only worn down slowly. Bronzes, unhardened and hardened steels are appropriate materials for this. However, other materials and coatings can be used, for example fibre-reinforced plastics.

The roller finishing roller consists of a material whose hardness is greater than that of the bearing surface to be processed. This prevents the deformation and fatigue of the roller finishing roller during the roller finishing process. The roller finishing roller can consist, for example, of a hardened steel grade or a hard metal. However, other materials and coatings, for example ceramic materials and coatings, can be used.

DRAWINGS

FIG. 2 shows one rolling tool;

FIG. 3 shows one finishing roller head in a perspective view;

FIG. 4 shows one roller cage;

FIG. 5 shows one finishing roller;

FIG. 6 shows one support roller head in a first perspective view; and

FIG. 7 shows the support roller head according to FIG. 6 in a different view.

DETAILED DESCRIPTION

Figure 1:
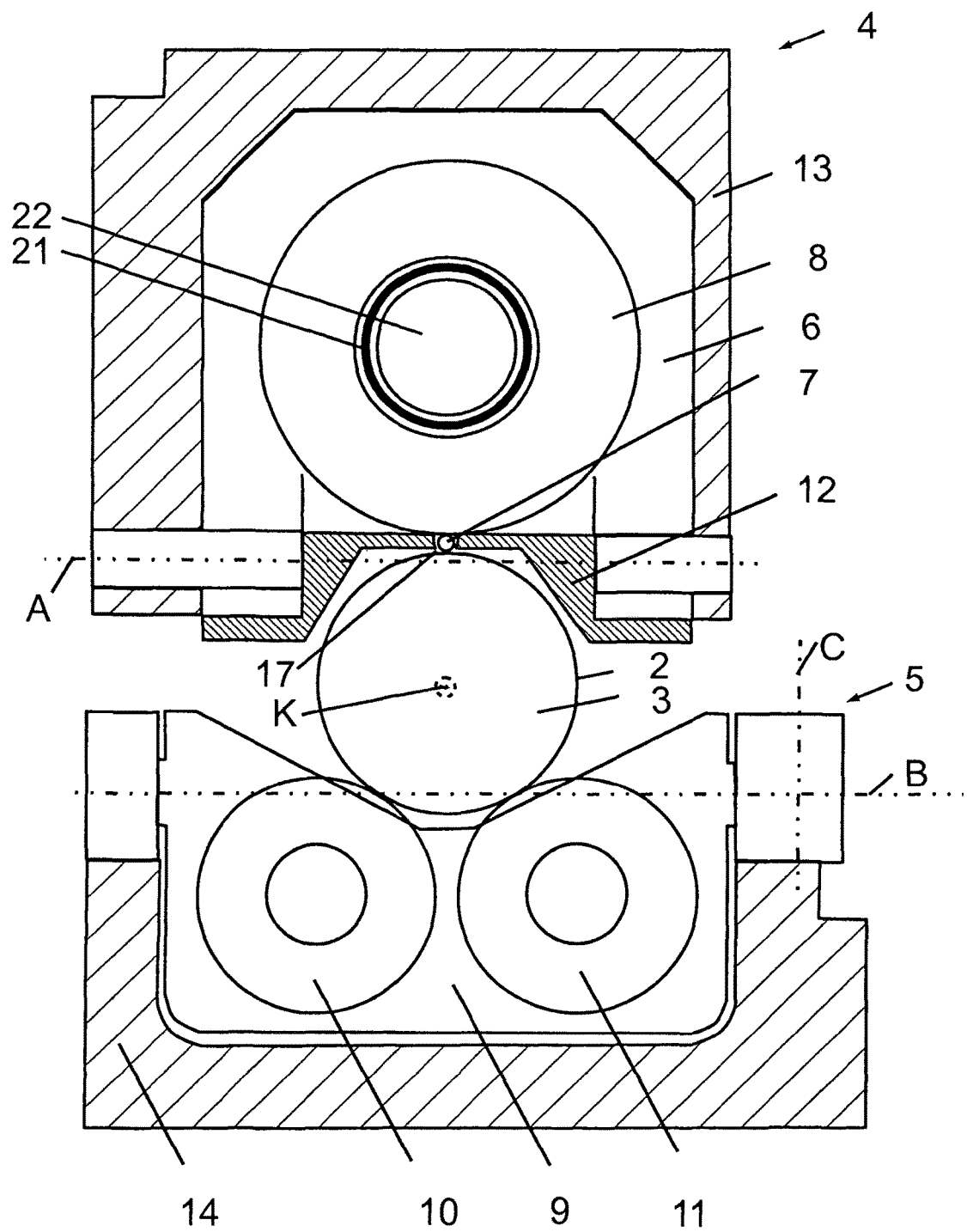
FIG. 1 shows one finishing roller head and one support roller head on a crankshaft.

In the following, the invention is explained in greater detail with reference to the drawings.

FIG. 1 shows a schematic diagram of a finishing roller head 4 and a support roller head 5 on a crankshaft 3 in a cross-section transversely to a crankshaft axis K of a crankshaft 3. One illustrated bearing surface 2 of the crankshaft 3 is a main bearing seat of the crankshaft 3. However, with the finishing roller head 4 it is also possible to process connecting rod bearings and journal bearings of the crankshaft 3 and other bearings. Orthogonally to the illustrated surface, the finishing roller head 4 and the support roller head 5 are designed to be so narrow that there are spaces with respect to the two crank cheeks which adjoin bearing surface 2. The support roller head 5 supports the crankshaft 3 against a rolling force exerted by the finishing roller head 4 through a roller finishing roller 7 on the crankshaft 3.

The finishing roller head 4 has a finishing roller head housing 6 which is mounted in such a way that it pivots around a first pivot axle A in a rolling tool 1 according to the invention in a finishing roller head frame 13. By pivoting around the pivot axis A, the roller finishing roller 7 can be aligned parallel to the crankshaft axis K. In the embodiment illustrated here, the finishing roller head 4 is self-adjusting, meaning that the finishing roller head housing 6 adjusts itself under the influence of the rolling force such that the roller finishing roller 7 and its axis are aligned parallel to the crankshaft axis K. In embodiments which are not illustrated, the finishing roller head 4 is fixed in place before rolling at an optimum angle with respect to the first pivot axis A.

The pressure roller 8 is mounted on a bearing bolt 22 in the finishing roller head housing 6 by a cylindrical roller bearing 21, which is only represented schematically. Through the pressure roller 8, the rolling force is transferred to the roller finishing roller 7 and from this to the bearing surface 2 which is to be processed. This causes the bearing surface 2 to be plastically deformed by the flow of material from elevations into recesses of a roughness profile of the bearing surface 2. In this manner the roughness profile of the bearing surface 2 is levelled off and the bearing surface 2 is provided with a smooth surface accordingly. Due to the roller-finished bearing surfaces 2, a combustion engine with a crankshaft processed in this way will only need to be run in for a short time and the service life of the engine is increased accordingly.

In the embodiment shown, the roller finishing roller 7 is guided on all sides in a roller cage 12 consisting of unhardened steel with a strip-shaped opening 17, the width of which on its visible side facing away from the finishing roller head 4 is smaller than the diameter of the roller finishing roller 7. The roller cage 12 therefore guides the roller finishing roller 7 axially on both ends, as well as peripherally on two surface areas located opposite to one another. The longer sidewalls in the strip-shaped opening 17, which serve as sliding surfaces for the lateral surface of the roller finishing roller 7, are designed as a corner groove. As a result, the roller finishing roller 7 is held against its gravity by the roller cage 12 when the roller finishing roller 7 is located on a spatially lower side of the finishing roller head 4. In order to replace the roller finishing roller 7, either the roller cage 12 or a cover of the finishing roller head housing 6 and the pressure roller 8 therefore have to be dismantled. In an embodiment which is not shown, the roller cage 12 has a corner groove only on one side wall of the strip-shaped opening 17 and this sidewall is provided spatially in such a way that the roller finishing roller 7 can rest on the sidewall with the corner groove and can be removed on the opposite sidewall of the strip-shaped opening 17.

In the illustrated arrangement, the support roller head 5 serves as a bearing block for the crankshaft 3 during roller finishing which provides a counterforce to the rolling force. For this purpose, the bearing surface 2 of the crankshaft 3 abuts two support rollers 10 and 11 mounted in the support roller housing 9. The support roller housing 9 is mounted in a support roller frame 14, to which the support roller head 5 can be attached, such that it is pivotable in two directions. With an alignment of the support roller head 5 around a second pivot axis B, an inclination in a plane in which the pivot axes of the support rollers 10 and 11 lie can be corrected with respect to the crankshaft axis K. In contrast, with the rotation around a third pivot axis C, the plane in which the pivot axes of the support rollers 10 and 11 lie can be rotated within itself in order to correct any tilting of the axes of rotation of the support rollers 10 and 11 with respect to the crankshaft axis K. In the illustrated embodiment, this third pivot axis C is not arranged centrally to cut through the crankshaft axis K in the support roller head 5, but laterally.

This lateral offset is not problematic, as it can be taken into account and corrected during the positioning of the support roller head 5 on the crankshaft 3.

FIG. 2 schematically shows an embodiment of a rolling tool 1 according to the invention. The finishing roller head 4 and support roller head 5 shown in FIG. 1 are presented here with only a few details for the sake of clarity. The rolling tool 1 is assembled in the shape of tongs using two tool arms 18 and 19 connected by a hinge 20. The finishing roller head 4 and/or the support roller head 5 are attached to these tool arms 18 and 19. The tool arms 18 and 19, as well as the hinge 20, serve as coupling elements which connect the finishing roller head 4 and the support roller head 5 together mechanically. The support rollers 10 and 11, as well as the roller finishing roller 7, which is supported on the pressure roller 8, enclose the crankshaft 3 on the bearing seat to be rolled. In the embodiment shown, a pin 15 is attached to the support roller head 5 as an additional coupling element, which engages in a matching centring hole 16 in the finishing roller head 4. This produces a high degree of torsional rigidity. In alternative embodiments, the rolling tool can also be constructed without forcipate tool arms 18 and 19. Then, for example, the support roller head 5 is formed as a fixed bearing block and the finishing roller head 4 is aligned with respect to the support roller head 5.

FIG. 3 shows an embodiment of a finishing roller head 4 in a spatial perspective. Here, the finishing roller head housing 6 is pivoted at a small angle which is very difficult to detect visually with respect to the finishing roller head frame 13. Due to the pivotability, the roller finishing roller 7 held by the roller cage 12 can be aligned parallel to the crankshaft axis K of the crankshaft 3 which is to be processed. The roller cage 12 is shown in FIG. 4 and the roller finishing roller 7 is shown separately in FIG. 5. The strip-shaped opening 17 is narrower on the side which is visible in FIG. 4 than the diameter of the matching roller finishing roller 7 shown in FIG. 5. This means that the finishing roller head 4 shown in FIG. 3 can also be used in a position in which the roller finishing roller 7 is located on the underside of the finishing roller head 4.

FIG. 6 and FIG. 7 show a support roller head 5 in two different perspective views where the pivotability of the support roller housing 9 with respect to the support roller frame 14 around the second pivot axis B is illustrated by large deflections.

The invention claimed is:

1. A rolling tool for the roller finishing of bearing surfaces of a crankshaft which is pivotable around a crankshaft axis, the rolling tool comprising:
a finishing roller head; and
a support roller head;
wherein the finishing roller head comprises a finishing roller head frame, a finishing roller head housing, a roller finishing roller, a pressure roller, and a roller cage;
wherein the roller finishing roller and the pressure roller are mounted in the finishing roller head housing;
wherein the roller finishing roller is guided on all sides by the roller cage;
wherein the support roller head comprises a support roller frame, a support roller housing, and two supporting rollers;
wherein the two support rollers are mounted in the support roller housing and are operable to support the crankshaft against a rolling force acting on the crankshaft through the roller finishing roller;
wherein both (i) the finishing roller head housing is mounted in the finishing roller head frame such that the finishing roller head housing is pivotable around a first pivot axis that is perpendicular to the crankshaft axis and parallel to a tangent on a working side of the roller finishing roller and (ii) the support roller housing is mounted in the support roller frame such that the support roller housing is pivotable around a second pivot axis which is perpendicular to the crankshaft axis and parallel to the first pivot axis, and around a third pivot axis which is perpendicular to the crankshaft axis and perpendicular to the first pivot axis; and
wherein the first pivot axis is defined by a secant passing through the crankshaft and being a distance of less than 10 millimeters from the tangent on the working side of the roller finishing roller.

2. The rolling tool according to claim 1, wherein the roller cage has a strip-shaped opening whose width on a side of the roller cage facing away from the finishing roller head is smaller than the diameter of the roller finishing roller.

3. The rolling tool according to claim 1, wherein the finishing roller head and the support roller head are mechanically joined together by at least one coupling element.

4. The rolling tool according to claim 3, wherein the coupling element is a pin which is attached to the support roller head and which is designed to engage in a centering hole in the finishing roller head.

5. The rolling tool according to claim 1, wherein the roller finishing roller has a cylindrical shape with a diameter of between 1 mm and 20 mm and a length which is greater than the width of the bearing surface.

6. The rolling tool according to claim 1, wherein the pressure roller and the support rollers have cylindrical, concave or spherical peripheral surfaces corresponding to a cylindrical, spherical or concave shape of a bearing surface to be processed.

7. The rolling tool according to claim 1, wherein the roller cage comprises a bronze, an unhardened steel or a hardened steel.

8. The rolling tool according to claim 1, wherein the roller finishing roller comprises a hardened steel or a hard metal.

9. The rolling tool of claim 1 wherein the second pivot axis is defined by a secant passing through the crankshaft and a plurality of support points of the crankshaft.

10. The rolling tool of claim 1 wherein the second pivot axis is defined by a secant passing through the crankshaft and the support rollers in close proximity to a plurality of support points of the crankshaft.

11. A rolling tool for the roller finishing of bearing surfaces of a crankshaft which is pivotable around a crankshaft axis, the rolling tool comprising:
a finishing roller head; and
a support roller head;
wherein the finishing roller head comprises a finishing roller head frame, a finishing roller head housing, a roller finishing roller, a pressure roller, and a roller cage;
wherein the roller finishing roller and the pressure roller are mounted in the finishing roller head housing;
wherein the roller finishing roller is guided on all sides by the roller cage;
wherein the finishing roller head housing is mounted in the finishing roller head frame such that the finishing roller head housing is pivotable around a first pivot axis that is perpendicular to the crankshaft axis and parallel to a tangent on a working side of the roller finishing roller;

wherein the support roller head comprises a support roller frame, a support roller housing, and two supporting rollers;

wherein the two support rollers are mounted in the support roller housing and are operable to support the crankshaft against a rolling force acting on the crankshaft through the roller finishing roller;

wherein the support roller housing is mounted in the support roller frame such that the support roller housing is pivotable around a second pivot axis which is perpendicular to the crankshaft axis and parallel to the first pivot axis, and around a third pivot axis which is perpendicular to the crankshaft axis and perpendicular to the first pivot axis; and wherein the second pivot axis is defined by a secant passing through the crankshaft and one of (i) a plurality of support points of the crankshaft; and (ii) the support rollers in close proximity to a plurality of support points of the crankshaft.

12. The rolling tool of claim 11 wherein the first pivot axis is defined by a secant passing through the crankshaft and being a distance of less than 10 millimeters from the tangent on the working side of the roller finishing roller.

13. The rolling tool according to claim 11, wherein the roller cage has a strip-shaped opening whose width on a side of the roller cage facing away from the finishing roller head is smaller than the diameter of the roller finishing roller.

14. The rolling tool according to claim 11, wherein the finishing roller head and the support roller head are mechanically joined together by at least one coupling element.

15. The rolling tool according to claim 14, wherein the coupling element is a pin which is attached to the support roller head and which is designed to engage in a centering hole in the finishing roller head.

16. The rolling tool according to claim 11, wherein the roller finishing roller has a cylindrical shape with a diameter of between 1 mm and 20 mm and a length which is greater than the width of the bearing surface.

17. The rolling tool according to claim 11, wherein the pressure roller and the support rollers have cylindrical, concave or spherical peripheral surfaces corresponding to a cylindrical, spherical or concave shape of a bearing surface to be processed.

18. The rolling tool according to claim 11, wherein the roller cage comprises a bronze, an unhardened steel or a hardened steel.

19. The rolling tool according to claim 11, wherein the roller finishing roller comprises a hardened steel.

* * * * *